United States Patent Office 3,374,287
Patented Mar. 19, 1968

3,374,287
POLYEPOXIDE PRODUCTS OF REDUCED ODOR CURED WITH SULFUR CONTAINING POLYACID COMPOUNDS AFTERTREATED WITH FORMALDEHYDE
Sylvan O. Greenlee, Lafayette, Ind., assignor, by mesne assignments, to Ciba Limited, Basel, Switzerland, a corporation of Switzerland
No Drawing. Original application Oct. 8, 1962, Ser. No. 229,217. Divided and this application Nov. 10, 1966, Ser. No. 607,096
3 Claims. (Cl. 260—836)

ABSTRACT OF THE DISCLOSURE

The odor associated with polyepoxide conversion products formed by reacting a polyepoxide having a functionality of greater than one vicinal epoxy group per molecule with a thioxyalkanoic acid containing at least one thioether group and at least two carboxylic acid groups, obtained by reaction of a mercapto acid and a diene polymer, is substantially reduced by treating the thioxyalkanoic acid after formation with formaldehyde in the presence of a mineral acid.

---

This application is a division of application Ser. No. 229,217, filed Oct. 8, 1962, now abandoned.

The present invention relates to novel polyacids suitable for reacting with polyepoxides for making infusible solvent-resistant resins and includes novel conversion mixtures of such polyacids with polyepoxides and the infusible solvent-resistant resin products resulting therefrom.

In copending application Ser. No. 85,437, filed Jan. 27, 1961, now U.S. Patent No. 3,288,766, is described polyepoxide conversion products formed by reacting a polyepoxide having a functionality of greater than one vicinal epoxy group per molecule with thioxyalkanoic acids. As described in this application, one of the advantages derived from using thioxyalkanoic acids wherein the thioxyalkanoic acid was a polyacid containing at least one thioether group and at least two carboxylic acid groups was the low temperature at which the conversion reaction occurred while still giving epoxide conversion products that had good acid and solvent resistance. A difficulty encountered with such polyepoxide conversion products, however, was that the thioxyalkanoic acid used in making the polyepoxide conversion product had a highly disagreeable odor. This disagreeable odor was not limited to the thioxyalkanoic acid but was also observed in the final polyepoxide conversion product made by reacting the acid with a polyepoxide. Although the epoxide resins formed had excellent properties with respect to both solvent and acid resistance, and had the further substantial advantage of being curable at relatively low temperatures, the disagreeable odor of these polyacids and the polyepoxide conversion products made therefrom would tend to discourage their use in some applications. The present invention is directed to removing, or substantially reducing, this disagreeable odor without deleteriously affecting the polyepoxide conversion product formed or the reactivity of the thioxyalkanoic acid adduct so as to interfere with the low temperature cures obtained. By low temperature cures is meant cures that are usually realized at temperatures of 25–125° C., and the preferable compositions cure in the temperature range of 25–50° C.

In accordance with the present invention, the thioxyalkanoic acid, after being formed, is treated with a solution of formaldehyde prior to reacting the same with a polyepoxide in forming the polyepoxide conversion product. The formaldehyde treatment substantially reduces the odor of the thioxyalkanoic acid. This reduced odor is further apparent in the polyepoxide conversion product made from thioxyalkanoic acid treated in this manner. In the preferred practice of the present invention, a mineral acid is included together with the formaldehyde in treating the thioxyalkanoic acid. The use of the mineral acid, such, for example, as HCl or $H_3PO_4$, together with the formaldehyde reduces the odor to a somewhat lower level than can be obtained through the use of formaldehyde alone, although substantial reductions in odor can be obtained without the presence of the mineral acid. In practicing the present invention, the thioxyacid, after being formed, may be treated with formaldehyde. Conveniently, the aqueous formalin solution and a mineral acid, in case the mineral acid is used, is added before the freshly prepared batch is cooled to room temperature. The formaldehyde may also be added at the time of mixing the conversion mixture of thioxyacid and epoxide. The various solid forms of formaldehyde may also be used. Heat may be applied to the formaldehyde thioxyacid mixture; however, a period of a few hours storage at 25° C. is usually sufficient to induce the deodorization activity. Based on formaldehyde content of formalin or other forms of formaldehyde, quantities of from about 0.1–5% of the thioxyacid give deodorization. However, preferable quantities are normally in the range of 0.25–3% of the thioxyacid weight.

The thioxyalkanoic acid adducts or, as sometimes referred to, curing agents, of application Ser. No. 85,437 are generally made by the reaction of an organic compound containing terminal olefin groups and a mercapto acid to give a polyacid product having the general formula:

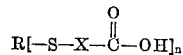

$$R[-S-X-\overset{\overset{\displaystyle O}{\|}}{C}-OH]_n$$

wherein X is selected from the group consisting of alkylene and substituted alkylene groups; and wherein R is an n-valent group selected from the group consisting of:
(1) n-Valent groups which may be considered as having been formed by removal of n hydrogen atoms from an organic compound selected from the group consisting of hydrocarbons, ethers, esters, polyethers and polyesters, and (2) n-valent substituted derivatives of such n-valent groups; wherein the n free valence bonds are attached to n different carbon atoms, each of said carbon atoms having an attached carbon atom having an attached hydrogen atom and having all four valences satisfied, each such pair of carbon atoms being a part of a group selected from the group consisting of aliphatic and non-aromatic carbocyclic groups; and wherein n is at least one; and wherein when n is one then R has at least one carboxyl group as a substituent.

In the foregoing formula, in obtaining the desired polyacids containing at least two carboxylic groups, one of the carboxylic groups may be in the R group. Particularly useful as curing agents are the mercapto acid addition products of diene polymers such as butadiene polymers or copolymers having a large proportion of terminal, i.e., 1,2-addition, units. As employed herein, the term "butadiene" is intended to embrace both butadiene and its homologues while the term "butadiene polymers" is intended to include butadiene homopolymers and the copolymers of butadiene with other monomers. As is well known to those skilled in the art, butadiene reacts to form polymers composed of 1,2- and 1,4-addition units, each unit being a $C_4$ chain containing a double bond as follows:

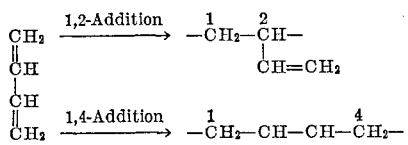

Examples of olefins containing a high percent of terminal (external or vinyl) olefin groups, are polyenes such as "Buton 100" and "Butarez" polymers. These polyenes reportedly contain 55–65% butadiene units as terminal olefin groups and 45–35% of the butadiene units as internal olefin containing units. "Buton 100" is a liquid butadiene-styrene copolymer of low molecular weight (8,000–10,000) and high unsaturation (iodine number approximately 300) and is available commercially from the Enjay Chemical Company. "Butarez" polymers are liquid butadiene polymers which contain on the average 0.8 double bond per $C_4$ unit giving iodine values of 375 to 400, these polymers having molecular weights in the range of 1000 to 2500. These polymers are available from Phillips Petroleum Company. Butarez 5 has a viscosity of 36–37 poises at 25° C. and 5.5 poises as a 90% solution in toluene at 25° C. Butarez 150 has a viscosity of 63–65 poises as a 90% solution in toluene at 25° C. Butarez A has a molecular weight of around 1800, a viscosity of 90–100 poises at 25° C.

Although butadiene polymers or copolymers having high 1,2-addition are particularly useful, polymers having relatively much lower 1,2-addition are quite useful for certain purposes especially when highly elastic and rubbery cured products are needed. Examples of this type are the SBR's (styrene-butadiene rubbers) commonly manufactured and sold in the United States by many companies. While these are similar chemically to the "Buton 100" mentioned previously, they differ in being much higher in molecular weight (100,000 or more), elastomeric solids rather than viscous liquids, and in having relatively less 1,2-addition (20% or 30% rather than 60%). A specific example is "Naugapol 1022," manufactured and sold by Naugatuck Chemical Division of U.S. Rubber Company. This is a styrene-butadiene copolymer containing 23.5% bound styrene, hot polymerized, stabilized with a non-staining antioxidant, glue-acid coagulated, having a Mooney viscosity ML–4 min. at 212° F. of 70–85.

Although the trade names and sources from which some of these commerically available olefins of the butadiene type have been given so as to clearly teach the type of materials that may be used in practicing the present invention, such commercially available butadiene polymers containing large proportions of their unsaturation as terminal (external or vinyl) olefin groups are also identified herein as polyenes bearing the numerical designations of 1 through 5, in which:

*Polyene 1* is a liquid butadiene styrene copolymer based on 80 parts butadiene and 20 parts styrene, having a molecular weight range of 8,000 to 10,000, an iodine value of approximately 300 and containing 55–65% of its olefin content as terminal olefin groups and the remainder as internal olefin groups.

*Polyene 2* is a butadiene polymer having a molecular weight in the range of 1000 to 1200, a viscosity of around 36–37 poises at 25° C. and 5.5 poises as a 90% solution in toluene at 25° C., and containing 55–65% of its olefin content as terminal olefin groups and the remainder as internal olefin groups.

*Polyene 3* is a butadiene polymer having a molecular weight in the range of 1500 to 1800, a viscosity of 98–100 poises at 25° C. and 12–15 poises as a 90% solution in toluene at 25° C., and containing the same range of terminal and internal olefin distribution as Polyene 2.

*Polyene 4* is a butadiene polymer having a molecular weight in the range of 2200 to 2500, a viscosity of 63–65 poises as a 90% solution in toluene at 25° C. and containing the same range of terminal and internal olefin distribution as Polyene 2.

*Polyene 5* is a synthetic rubber of the butadiene styrene copolymer type, soluble in toluene, and containing about 20% of its unsaturation as terminal olefin content. This elastomeric solid has a molecular weight in excess of 100,000 and is based on 23.5% styrene.

When the polyepoxide conversion products of this invention are used as coating compositions, it is preferred that the butadiene polymer used in forming the polyacid curing agent have a relatively low molecular weight (e.g., less than 25,000). When the polyepoxide conversion products are used as adhesives, however, the butadiene polymer used in forming the polyacid curing agent may have a much higher molecular weight.

Additional curing agents which may be used are those derived from the reaction of (1) polyallyl ethers of polyhydric alcohols, such, for example, as pentaerythritols, mannitol, sorbitol, glycerol and starches and (2) mercapto acids. Also useful as polyacid curing agents are the reaction products of mercapto acids with polyallyl esters of polybasic acids (e.g., phthalic, maleic, citric and pyromellitic acids). Other valuable allyl esters for reaction with the mercapto acids are the allyl esters of copolymers of maleic anhydride and styrene. Also useful as curing agents are the reaction products of mercapto acids and unsaturated polyesters, such as the esters of maleic and fumaric acid with glycols. Additional curing agents are those formed by the reaction of an unsaturated acid (e.g., undecanoic acid) and a mercapto acid.

In addition to the aforedescribed polyacid curing agents, another curing agent which may be used is that formed by the reaction of a cyclopentadiene, such, for example, as dicyclopentadiene, with a mercapto acid.

The preferred mercapto acid in forming the polyacid curing agents of this invention is mercaptoacetic acid. This acid exhibits high reactivity with olefins in forming polyacid addition products. Beta mercaptopropionic acid, while less reactive than mercaptoacetic acid with a polyene, gives good yields of polyacids in reaction with polyenes. Examples of other acids which may be used in forming polyacid curing agents are mercaptobutyric acid and mercaptopentanoic acids.

The polyepoxides cured in accordane with this invention are those containing more than one vicinal epoxide group per molecule.

Illustrative of the vicinal epoxide compositions which may be employed in this invention are the complex epoxide resins which are polyethers formed by reacting polyhydric phenols with such polyfunctional materials as polyhalohydrins, polyepoxides, or epihalohydrins to form polymeric materials having alternating aliphatic chains and aromatic nuclei connected to each other by ether linkages. Typical of these complex epoxide resins are the reaction products of bis (4-hydroxyphenyl)dimethyl methane (bisphenol A) with excess molar portions of epichlorohydrin.

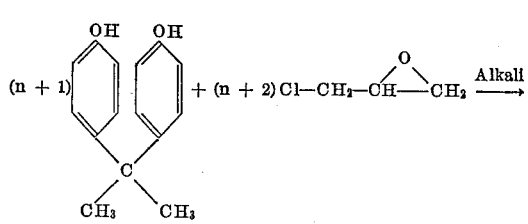 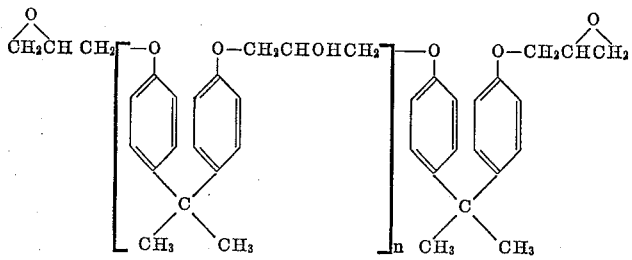

As used in the above formula, n indicates the degree of polymerization and may have the value of 0 or a positive whole number. Typical of these complex epoxide resins are those marketed by the Shell Chemical Corporation under the trade names of Epon 828, Epon 838, Epon 1001, Epon 1004, Epon 1007, Epon 1009, and Epon 1031.

Another group of resinous polyepoxides useful in reaction with olefin-mercapto acid adducts are the glycidyl ethers of phenol formaldehyde condensates.

The epoxide compositions which may be used in preparing the compositions of this invention also include aliphatic polyepoxides which may be illustrated by such polyepoxides as the polymerization products obtained by polymerizing epoxyalkyl alkenyl ethers such as allyl glycidyl ether through the unsaturated portion to give the so-called polyallyl glycidyl ether (PAGE) having a chemical structure corresponding closely to the following formula:

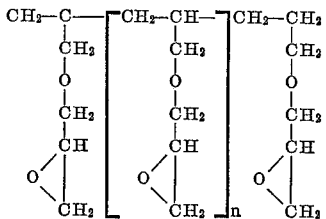

These products in which n is an integer from 0 to about 7 are available in experimental quantities from the Shell Chemical Corporation.

Still other aliphatic polyepoxides which may be used are illustrated by the poly(epoxyalkyl) ethers of polyhydric alcohols. These polyepoxides, for instance, may be obtained by reacting a polyhydric alcohol with an epihalohydrin followed by dehydrohalogenation. Illustrative is the reaction, for example, of epichlorohydrin with glycerol in the presence of boron trifluoride to give an intermediate chlorohydrin which is dehydrohalogenated to give a mixed product as illustrated by the following typical reaction:

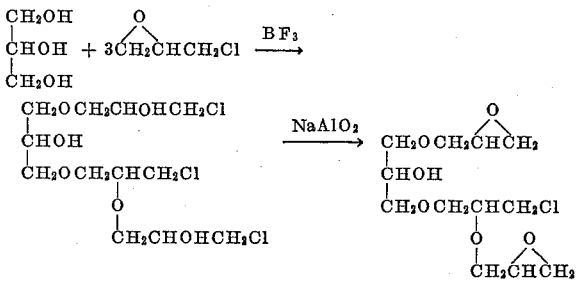

A commercial product of this type is Epon 812 having an equivalent weight to epoxide of approximately 150 and marketed by the Shell Chemical Corporation. The preparation of a large number of these mixed polyepoxides is described more fully in Zech's U.S. Patent 2,581,484.

Still other aliphatic polyepoxides which have been found to be valuable in reaction with the olefin-mercapto acid adducts in producing the cured products of this invention include diepoxybutane, diglycidyl ether, limonene diepoxide, and diepoxydicyclopentadiene.

Examples of commercially available polyepoxides are as follows:

*Epoxide 1.*—A bisphenol A-epichlorohydrin type polyepoxide sold under the trade name Epon 1001 and having a softening point of 64–76° C. and an epoxide equivalent weight of 450–525.

*Epoxide 2.*—A bisphenol A-epichlorohydrin type polyepoxide sold under the trade name Epon 828 and having a softening point of 8–12° C. and an epoxide equivalent weight of 190.

*Epoxide 3.*—A liquid polymer of allyl glycidyl ether sold under the trade name Epon X–701 and described as polyallyl glycidyl ether (PAGE) having an epoxide equivalent weight of approximately 135.

*Epoxide 4.*—A glycidyl ether sold under the trade name Epon 812 and prepared from the reaction of epichlorohydrin with glycerol containing an equivalent weight to epoxide of approximately 150.

*Epoxide 5.*—An epoxidized soya bean oil having an epoxide equivalent weight of 230–240 and sold under the trade name Epoxol 7–4.

*Epoxide 6.*—A liquid epoxidized butadiene polymer having an epoxide equivalent weight of 175–180 and a viscosity of 1800 poises sold under the trade name "Oxiron 2000."

In the foregoing, illustrative examples of olefins containing a high percentage of terminal olefin groups, of mercapto acids, and of polyepoxides have been given. The following examples, which are further given for purposes of illustration only, illustrate the preparation of thioxyalkanoic acids and the deodorizing of the same in accordance with the present invention. Thioxyalkanoic acids designated "A," "B," and "C" are made as follows:

*Acid A.—The reaction of mercaptoacetic acid with a liquid butadiene polymer*

A five-liter, three-neck flask is provided with a mechanical stirrer, a thermometer, a condenser, and a heating mantle. Into this flask is placed 500 grams of polyene 3 (a liquid butadiene polymer) having a molecular weight of around 1800, a viscosity of 98–100 poises at 25° C., and an average of about 0.8 double bond per $C_4$ unit and containing approximately 60% of its unsaturation as terminal and 40% as internal olefin groups (Butarez A, Phillips Petroleum Company); 1000 grams of toluene; and 680 grams of mercaptoacetic acid. While continuously stirring, the temperature of the contents of the flask is raised gradually from 26° C. to 60° C. over a period of 2.75 hours and then held at 60–66° C. for a further period of 6.5 hours. The heat source is then removed and the reactants let stand for another 8½ hours. The toluene and unreacted mercaptoacetic acid are removed by distillation letting the pot temperature finally reach 160° C. at a reduced pressure of 2 mm. of mercury. A viscous semi-solid product weighing 809 grams is obtained. This product has an acid value of 270 (equivalent weight=208) and gives a viscosity of A at 40% nonvolatile in methyl isobutyl ketone (Gardner bubble viscometer). This thioxyalkanoic acid product has a relatively strong disagreeable odor.

*Acid B.—A thioxyalkanoic acid from the reaction of mercaptoacetic acid with a liquid copolymer of butadiene and styrene*

A two-liter three-neck flask is provided with a mechanical stirrer, a thermometer, and a condenser. In this flask is placed 333 grams of a liquid copolymer of butadiene and styrene having a molecular weight in the 8000 to 10,000 range, an iodine value of 300, a viscosity of 10 poises at 90% non-volatile in toluene and containing approximately 60% of its unsaturation as terminal and 40% as internal olefin groups (Buton 100, Enjay Chemical Company); 333 grams of toluene; and 200 grams of mercaptoacetic acid. While continuously stirring the contents, the temperature is slowly raised from 25° C. to 65° C. over a period of 5 minutes due to exothermic reaction, mercaptoacetic acid is removed by gradually increasing the pot temperature to 160° C. while reducing the pressure to 17 mm. of mercury. A light straw-colored sticky product is obtained amounting to about 520 grams and having an acid value of 217 (equivalent weight=260). This thioxyalkanoic acid product has a highly disagreeable odor.

*Acid C.—Reaction product of mercaptoacetic acid and liquid copolymer of butadiene and styrene followed by treatment with formaldehyde and HCl*

Using a similar reaction vessel to that described in the preparation of acids "A" and "B," 250 grams of Buton 100 and 160 grams of mercaptoacetic acid are placed in the vessel and with continuous stirring, the temperature is raised to 100° C. and held at between 99° C. and 101° C. for 5 hours. The unreacted mercaptoacetic acid is removed by raising the temperature of the vessel contents to 150° C. while reducing the pressure to 2 mm. of mercury. The reaction mixture is cooled to 100° C. and treated with 10 ml. of 38% formaldehyde and 3 ml. of 37% HCl, heated with stirring to 150° C., held at this temperature for 0.25 hour and again stripped by holding the pot temperature at 150–152° C. while reducing the pressure to 2 mm. of mercury.

It will be noted that acid "C" is deodorized during the process of its preparation. The odor level on acid "C" is observed to be substantially lower than that of non-treated acids "A" and "B." Acid "C" is used directly in reaction mixtures with epoxides to give conversion systems possessing a low level of odor. The odor level is observed on specimens consisting of films of 0.003 inch wet thickness spread on tin plate from 40–50% solutions in toluene. Illustrative specimens include the following films which are spread from the mixtures indicated.

Film 1: A mixture of 15 grams of the thioxy acid "B" treated with 1 ml. 38% formaldehyde and 0.3 ml. of 85% $H_3PO_4$, warmed with stirring to 100° C., cooled to room temperature and mixed with 12.5 grams of epoxide 5.

Film 2: Same as film 1, but without the $H_3PO_4$.

Film 3: Same as film 1, but use methyl isobutyl ketone to obtain 50% solutions rather than toluene.

Film 4: A mixture of 30 grams of the thioxy acid "B" and 1 ml. 38% formaldehyde mixed at room temperature.

Film 5: A mixture of 15 grams of the thioxy acid "A," 1 ml. of 38% formaldehyde and 0.3 gram $H_3PO_4$ mixed at room temperature.

Film 6: A mixture of 15 grams of the thioxy acid "B," 1 ml. of 38% formaldehyde and 0.3 gram 37% HCl mixed at room temperature.

Film 7: Thioxy acid "A."

Film 8: Thioxy acid "B."

Films 9: Thioxy acid "C."

Film 10: A mixture of 15 grams of thioxy acid "B" and 12.5 grams of epoxide 5.

Film 11: A mixture of 15 grams of thioxy acid "B" treated with 0.3 ml. of 85% $H_3PO_4$, warmed with stirring to 100° C., cooled to room temperature, and mixed with 12.5 grams of epoxide 5.

Film 12: A mixture of 15 grams of thioxy acid "A" and 12.5 grams of epoxide 5.

Films 1 through 6 and film 9 are substantially deodorized compared to films 7, 8, 10, 11 and 12. Of the deodorized films, Nos. 1, 3, 5, 6, and 9, using some mineral acid along with the formaldehyde, show somewhat greater deodorization than that exhibited by films 2 and 4 using formaldehyde alone.

There is little difference in compositions treated with formaldehyde at room temperature of 25° C. and at an elevated temperature provided the room temperature treated composition is permitted to stand for a period of at least 1 to 2 hours before film application. In thick layer application this standing period of 1–2 hours is not required. It is, however, often convenient to add the formaldehyde or formaldehyde and mineral acid at the end of the thioxyacid prepartion without waiting for the batch to cool to room temperature. The above acid "C" preparation illustrates such an addition. In each instance the result is a substantial reduction in odor level of the thioxyacid without any noticeable impairment of the thioxyacid when used with an epoxy compound in forming conversion products or the conversion products so formed.

Having thus described my invention, I claim:

1. A polyepoxide conversion product of reduced odor formed by reacting a polyepoxide having a functionality of greater than one vicinal epoxy group per molecule with a stable polyacid containing at least two thioether groups, each of which is connected through a carbon chain to a carboxylic acid group, wherein said polyacid is a reaction product of a mercapto acid and a diene polymer and wherein said polyacid, after formation, is treated with formaldehyde in the presence of a mineral acid.

2. A polyepoxide conversion product according to claim 1 wherein the diene polymer is butadiene.

3. A polyepoxide conversion product according to claim 1 wherein the diene polymer is a copolymer of butadiene and styrene.

References Cited

UNITED STATES PATENTS 3,288,766   11/1966   Greenlee et al. _____ 260—835

MURRAY TILLMAN, *Primary Examiner.*

P. LIEBERMAN, *Assistant Examiner.*